April 18, 1967 A. J. ANTHONY 3,314,859
NUCLEAR REACTOR FUEL ASSEMBLY-CONTROL ROD ORGANIZATION
Filed Dec. 5, 1963
2 Sheets-Sheet 1

April 18, 1967 A. J. ANTHONY 3,314,859
NUCLEAR REACTOR FUEL ASSEMBLY-CONTROL ROD ORGANIZATION
Filed Dec. 5, 1963 2 Sheets-Sheet 2
FIG. 3
FIG. 2
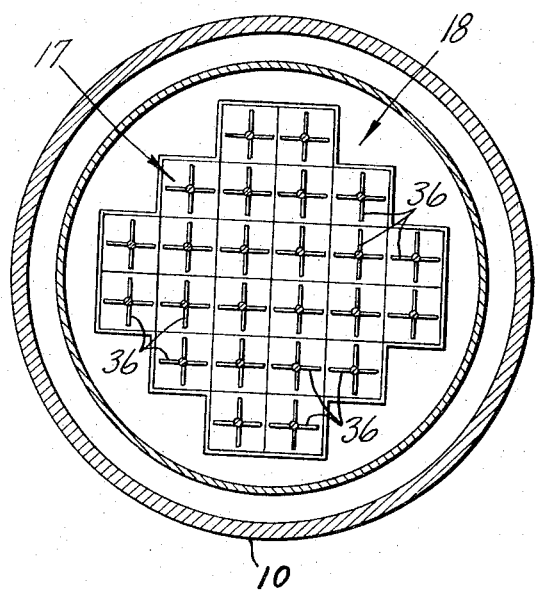
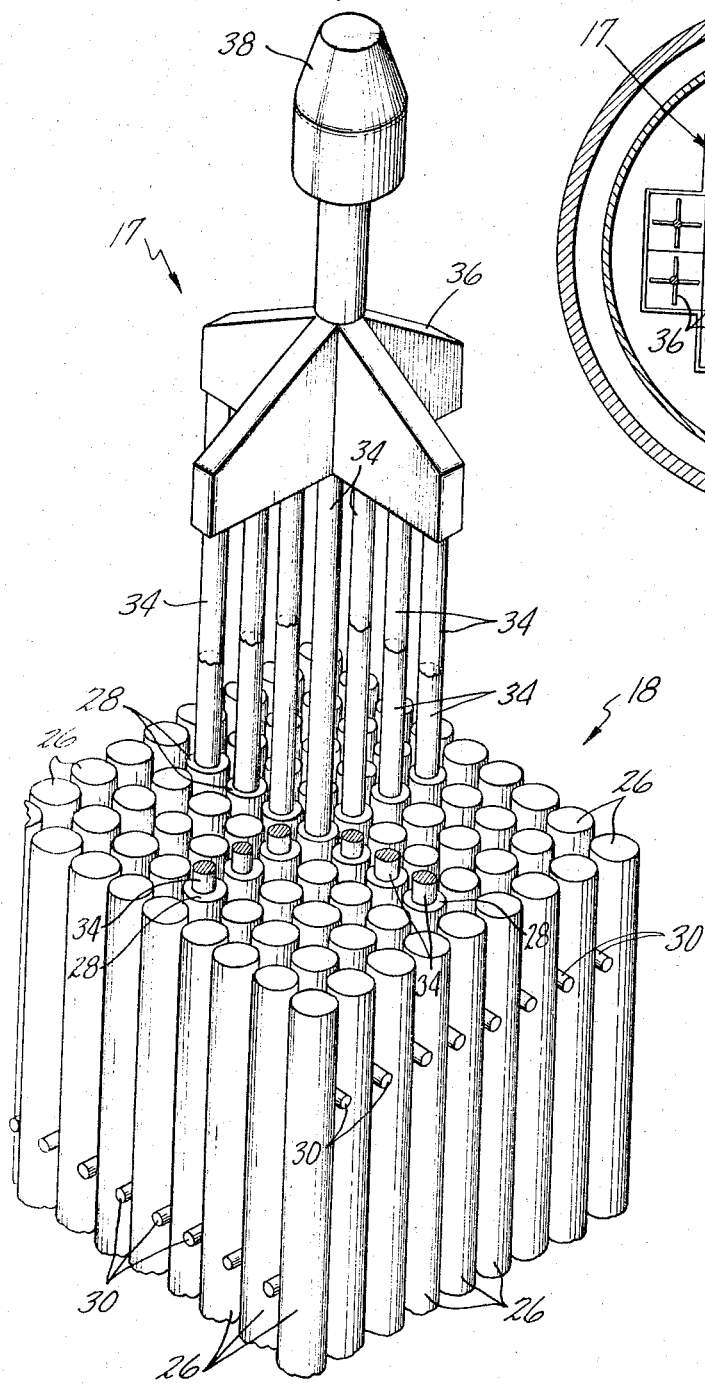

United States Patent Office 3,314,859
Patented Apr. 18, 1967

3,314,859
NUCLEAR REACTOR FUEL ASSEMBLY-CONTROL ROD ORGANIZATION
Andrew J. Anthony, Tariffville, Conn., assignor to Combustion Engineering, Inc., Windsor, Conn., a corporation of Delaware
Filed Dec. 5, 1963, Ser. No. 328,306
5 Claims. (Cl. 176—50)

This invention relates generally to the nuclear reactor art and particularly heterogenous nuclear reactors with the invention being directed to control of these reactors by means of poison members that are moved into and out of the reactor core.

In the type of reactor to which the invention pertains, at least a portion of the reactivity or power output of the reactor is controlled by the adjustment of control rods with relation to the reactor core, with the reactivity being decreased the further the control rods are inserted into the core. It has been generally the practice, particularly, in relatively large reactors, to construct the core of a relatively large number of separate fuel assemblies. Each of these assemblies is comprised of a number of fuel elements which may be tubes filled with a fuel material, with the elements in each assembly being in fixed spaced relation so that the coolant can pass over the elements of the assembly. Each of the assemblies is generally separately removable from the reactor core. With this construction the control rods which are generally in the form of plates or a plate like construction are received in the reactor core either between assemblies, with the assemblies being spaced sufficiently to provide the necessary room for the control rods, or within slots provided in the assemblies. This arrangement entails some difficulty with regard to the necessary uniform spacing of the assemblies to provide for the control rod, with exact dimensioning and manufacturing being required. Furthermore, with the prior constructions in reactors that utilize a coolant-moderator, such as pressurized and boiling water reactors, there is a serious problem with relation to the hot spots in the reactor caused by the control rod channels. These channels cause an increase in the amount of moderator at the location of the channels which in turn results in greater power output with relation to the fuel in this vicinity and according to a higher temperature of the fuel in this vicinity.

Various attempts have been made to reduce this effect, with limited success thus far being obtained. For example, one technique that is commonly employed is to use full length control rod followers which serve to displace the moderator-coolant when the control rod is withdrawn. While these followers will reduce the magnitude of the hot spots, they will not, unfortunately, eliminate them or reduce them to the extent desired. This is so for the reason that mechanical clearance between the control rod and the reactor core as well as between the follower and the core is necessary in order to insure proper operation of the control rod. This spacing between the control rod follower and the adjacent portions of the reactor core cause hot spots, or in water cooled reactors what is termed "water gap peaking." Moreover, with full length followers, a longer pressure vessel is required in order to accommodate the followers within the vessel when the control rods are in their fully inserted position within the core. Another attempt at reducing the hot spots caused by the use of control rods in the manner described has been to employ flux suppression devices that are located adjacent to the control rod channels. For example, in the portion of the fuel assembly located adjacent to the control rod channel, fuel elements of a different fuel material or different fuel enrichment may be employed. Again, this technique is not fully satisfactory, however, since the control rod worth may be reduced and a more complicated fuel bundle results.

As contrasted with prior arrangements the reactor control means of the present invention distributes the control material, i.e., the poison material, more uniformly throughout the core of the reactor and in such a manner as to reduce and to a large extent overcome the problem of power peaking mentioned hereinbefore. With the invention, control of the reactor is achieved by adjustment of a plurality of control assemblies into and out of the reactor core. Each of the control assemblies is associated with and disposed within a fuel assembly with there being numerous fuel assemblies that make up the core of the reactor. Each of the control assemblies takes the form of a plurality of separate spaced rods which are connected at their upper end to a common header with these spaced rods being received or telescoped within sleeves or hollow tubes that are secured within and form a part of the fuel assembly. These sleeves or tubes have the same outside diameter as the fuel rods of which the assembly is comprised and these hollow tubes as well as the fuel tubes are all retained in uniform spaced relation throughout the area of the fuel assembly. These hollow tubes, which are retained within the fuel assembly when the control rod assembly is withdrawn, are effective to reduce water gap peaking in that the amount of moderator is decreased in this particular location by the volume of the hollow tubes. This effect can be more pronounced by employing tubes that are fabricated of a material or that contain a material which has a substantial neutron absorption cross-section. Furthermore, the construction of the scabbard or shroud for the control rods is preferably such that a dash-pot or buffering action is produced during the final portion of a control rod scram.

Accordingly, it is the object of this invention to provide an improved nuclear reactor organization.

Another object of the invention is to provide such an improved organization wherein a novel control arrangement is utilized.

A further object of the invention is to provide an improved nuclear reactor fuel assembly having incorporated therein control means.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following description of an illustrative embodiment shown by the accompanying drawings wherein:

FIGURE 2 is a transverse section view of the reactor looking down on the core;

FIGURE 3 is a perspective view of one of the fuel assemblies of the invention showing the control rod assembly associated with the fuel assembly;

Figure 1:
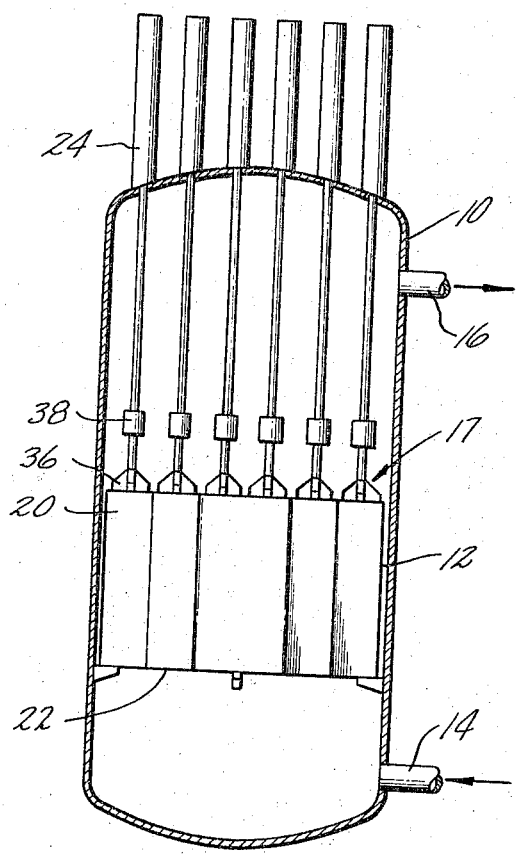
FIGURE 1 is a diagrammatic representation of a nuclear reactor employing the present invention.
Figure 5:
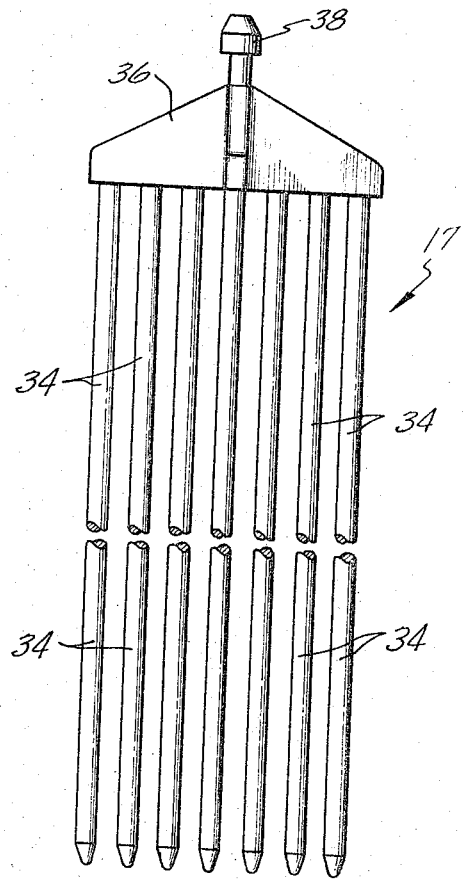
FIGURE 5 is an elevational view of the control rod assembly which forms a part of the present invention.

Referring now to the drawings, wherein like reference characters are used throughout to designate like elements, there is diagrammatically depicted in FIGURE 1 a pressurized water nuclear reactor which includes the pressure vessel 10 within which is mounted the core 12. Water enters the vessel 10 through the inlet 14 and passes up through the core where the water is heated by contacting the outer surface of the fuel elements with this heated water passing from the vessel 10 through the outlet 16.

The reactor core 12 is comprised of a relatively large number of separate and independent fuel assemblies 18 which are maintained in fixed relation with each other in the reactor core by means of the upper and lower plates or grids 20 and 22 and which are independently removable from the core. The relative relation of the assemblies 18 in the core, in accordance with the present invention, is such that the spacing between these assemblies is generally the same as the spacing between the fuel elements in each assembly itself. Thus between the assemblies there is no larger water gap than there is between the various fuel elements in any particular assembly so that flux peaking or hot spots caused by the spacing of adjacent flue assemblies is avoided.

In the present invention control of the reactor, at least in part, is provided by means of adjustable control rod assemblies 17 that may be provided with all or some of the fuel assemblies 18 depending upon the particular reactor design. As shown in FIGURE 1, the control rod assemblies 17 are adjusted with relation to the core 12 by means of the control rod drives 24 with these being connected to the upper end of the header portion of the control rod assembly and being effective to move the assembly vertically into and out of the reactor core 12.

Figure 4:
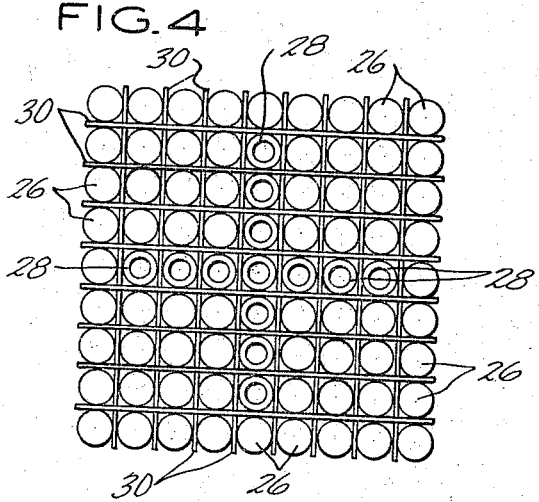
FIGURE 4 is a transverse sectional view of the fuel assembly of the invention per se.

FIGURES 3 and 4 illustrate one of the fuel assemblies or fuel bundle assemblies which has incorporated therein means for controlling the reactor or in other words, which is constructed to receive one of the control rod assemblies 17. As illustratively disclosed, this fuel assembly 18 of FIGURES 3 and 4 includes a plurality of rod type fuel elements 26 as well as a plurality of hollow tubes or sleeves 28 with these sleeves preferably having the same outside diameter as the fuel rods 26. Fuel tubes or rods 26 may be stainless steel tubes within which is contained compacted UO₂ powder with the tubes being sealed and capped at both ends. The fuel rods 26 and the hollow tubes 28 of the assembly 18 are all in parallel uniformly spaced relation and are maintained in fixed relation and in a particular array by any suitable means such as providing spacer bars 30 between the various rows of tubes and rods with the tubes and rods being welded to the spacer bars. A number of such spacer bars will, of course, be provided throughout the length of the assembly 18.

In the illustrative arrangement, the hollow tubes 28 are disposed in a transverse configuration which is generally cruciform (FIGURE 4) and the control rod assembly 17 is comprised of a plurality of control rods 34 that are arranged in a similar transverse configuration arrangement. The rods 34 are either made of or contain a material that is a neutron poison, i.e., that has a high neutron absorption cross-section. Thus the rods 34 may be made of or may contain boron carbide, gadolinium oxide, a silver-indium-cadmium combination or other neutron poison material. The rods 34 of each assembly 17 are connected to a common header means 36 at their upper ends with its header means including a connector 38 for connection with the control rod drive means. The rods 34 are of such a diameter that they are received within the hollow tubes 28 relatively freely and such that they can move longitudinally within the tubes. The rods 34 associated with a particular fuel assembly 18 are thus simultaneously moved by one of the control rod drives 24 between an upper or outer position where only the tips of the rods 34 are received within the upper ends of the hollow tubes 28 and an inner or innermost position where the rods 34 extend generally throughout the entire length of the hollow tubes 28. The control rod drive 24 cannot withdraw the rods 34 completely from the tubes 28.

Figure 6:
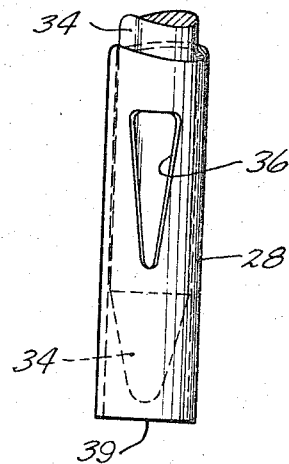
FIGURE 6 is a detailed elevational view of the lower region of one of the tubes which receives a control rod.

In order to retard or slow the rapid movement of the control rod assembly into the fuel element assembly 18 incident to a scram action of the control rod, means are provided to effect a buffering or dash pot action as the control rod assembly nears the final or lower portion of its movement. In the illustrative arrangement, this is effected by providing a lateral opening or lateral openings in the hollow tubes 28 at the lower region thereof and at a location above the location of the end of the control rods 34 when these rods are inserted their full extent within these tubes. As shown in FIGURE 6 this lateral opening may be in the form of a triangular passage 36. As the rod 34 approaches the limit of its downward movement in the tube 28, water is being forced from the tube through the open end 39 and through the triangular opening 36. When the rod 34 passes down past the opening 36, the flow through this opening will be substantially restricted thereby increasing the resistance to the downward movement of the rod 34 and causing a dampening of such movement. The opening 39 will be of sufficient restriction to give the desired dampening action.

It will be appreciated that with the arrangement of the present invention each of the control assemblies 17 has its poison or in other words the poison rods 34 distributed so that the poison is not in a large concentrated mass or lump as is the case with conventional control rod organizations. By spacing the control rods 34 upon the same centerline spacing as the tubes that make up the fuel assembly and by having these control rods be of a relatively small diameter (smaller than the corresponding diameter of the fuel tubes in the illustrative embodiment), there is not a large concentration of moderator brought into being as a result of removing their control position to a position where they extend substantially entirely out of the reactor core. By thus distributing the poison control material the problem of power peaks or water gap peaking is very much lessened with there being no severe or major power peaks produced with this distributed control rod arrangement. Furthermore, the use of the shroud or sleeve 28 within which each of the control rods is telescoped is of added advantage with regard to elimination of power peaking. This is so because this shroud occupies a volume that would otherwise be occupied by moderator. While the shroud is of advantage for this purpose if it is fabricated of zirconium, a still further advantage can be achieved if the shroud is fabricated of a material that has a substantial neutron absorption cross-section. Thus stainless steel would be useful in this connection. Furthermore, the shroud may contain a burnable neutron poison (boron) to increase its absorption cross-section and thus act as a flux suppressant thereby helping in connection with avoiding power peaking. The use of a burnable poison in the shrouds, such as boron previously mentioned, is an advantage in that the effectiveness of the burnable poison would gradually decrease along with the decrease in reactivity of the fuel as core life progresses. Thus the action of the burnable poison will remain within a desired range to provide the desired flux suppression.

The invention thus offers the improvement where the poison is more homogeneously distributed throughout the transverse section of the core so as to eliminate any severe power peaking problem and offers the further improvement with regard to the disposition of a flux suppressant particularly located to reduce or eliminate water gap peaking.

While the transverse configuration of the control rod assembly and accordingly of the tubes 28 in the fuel assembly 18 (FIGURES 3 and 4) is generally cruciform, any desired configuration may be employed, such as square, triangular or others.

With the organization of the present invention, an improved construction is provided which is relatively easy to fabricate; which substantially eliminates hot spots and flux peaking incident to the disposition and arrangement of control rods; which permits factory assembly of the control rod means within the fuel assembly; and which provides for dampening of the control rod movement incident to scram.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A fuel assembly for use in an upright position in the core of a nuclear reactor employing a liquid coolant comprising a plurality of upright tubular members in fixed uniform spaced relation, a majority of said members containing a nuclear fuel, some of said members being hollow and open at their upper ends, control rods containing a neutron poison material telescoped within said hollow members and connected at their upper ends to a common header member whereby they may be simultaneously moved longitudinally of the hollow members between an upper position where only the tips of the control rods extend within the hollow members and a lower position where the rods extend into and generally the full length of the hollow members, said hollow members having openings in the lower region thereof for the passage of liquid therethrough with at least some of these openings being above the lower end of said poison members when said members occupy their lowermost position.

2. The fuel assembly of claim 1 wherein said hollow members are comprised of a material that contains a burnable poison.

3. In a nuclear reactor having a core with a coolant-moderator being passed through the core and over the fuel elements of the core and with the core being comprised of a number of separate fuel assemblies, the improvement wherein at least some of said assemblies are comprised of upright tubular members in fixed spaced relation, some of these tubular members in a predetermined transverse pattern being hollow and open at their upper ends, a control rod received within each of said hollow members in a manner permitting relative longitudinal movement therewithin with the upper end of the rods extending from the upper end of the tubular members and being secured to a common header, said hollow tubular members being of a material that contains a burnable poison, and the remaining tubular members of the assembly containing a nuclear fuel.

4. The organization of claim 5 having openings in the lower region disposed with relation to the control rod so that a damping action is effected incident to rapid movement of the rod to its inner position.

5. A nuclear reactor having a core through which water is conveyed as a moderator-coolant with the core including a plurality of separate fuel assemblies each of which is comprised of fuel rods, characterized by at least some of said assemblies having associated therewith control means for controlling the reactivity of the reactor, each of these last-named assemblies comprising a plurality of vertically extending tubes in uniform, fixed spaced relation, some of said tubes being hollow for reception of control rods with these tubes being in a particular transverse arrangement, the remaining tubes being fuel tubes containing a nuclear fuel, a control rod assembly comprising a plurality of depending control rods connected at their upper end to a common header, each of said rods being received in one of the hollow tubes in a manner permitting longitudinal movement therewithin, whereby the rods may be simultaneously moved from an innermost position where they extend generally the full length of said hollow tubes and an outermost position where only the tips of the control rods are disposed within said hollow tubes, said hollow tubes having openings at a location positioned above the inner end of the control rod when it is in its fully inserted position in the tube to dampen the inward movement of said control rods as they approach their innermost position.

References Cited by the Examiner

UNITED STATES PATENTS

| 3,093,563 | 6/1963 | Menke | 176—50 |
| 3,158,543 | 11/1964 | Sherman et al. | 176—50 |
| 3,212,979 | 10/1965 | Silverblatt | 176—36 |
| 3,231,473 | 1/1966 | Hennig | 176—36 |

OTHER REFERENCES

AEC documents: (1) MND-M-1815, April 5, 1960, pp. II-4, 5, 6, 7, 10, and 11; (2) MND-M-1858, September 1961, pp. 132, 133, 332, and 333; (3) MND-MD-2560-3, May 1962, pp. 22-29, 36, 37, and 65-69; (4) MND-MD-2560-4, August 1962, pp. 13, 15, 16, and 21-27.

Directory of Nuclear Reactors, vol. 4, pp. 21-26, publ. by IAEA in 1962.

CARL D. QUARFORTH, *Primary Examiner.*

REUBEN EPSTEIN, *Examiner.*

L. DEWAYNE RUTLEDGE, M. DINNIN, *Assistant Examiners.*

PO-1050
(5/69)

UNITED STATES PATENT OFFICE
CERTIFICATE OF CORRECTION

Patent No. 3,314,859       Dated   April 18, 1967

Inventor(s)   A. J. Anthony

It is certified that error appears in the above-identified patent and that said Letters Patent are hereby corrected as shown below:

Column 5, line 47, change "5" to --3--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents